United States Patent
Shepard et al.

(10) Patent No.: US 9,298,764 B2
(45) Date of Patent: Mar. 29, 2016

(54) PARTIAL SOURCE VERIFICATION OF EDC DATA

(71) Applicant: ORACLE INTERNATIONAL CORPORATION, Redwood Shores, CA (US)

(72) Inventors: Scott Shepard, Waltham, MA (US); Hanan Butler, Boston, MA (US); Paul Bradford, Bedford, MA (US); Paul Boyd, Dorchester, MA (US); Scott Kay, Princeton, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 399 days.

(21) Appl. No.: 13/874,643

(22) Filed: May 1, 2013

(65) Prior Publication Data

US 2013/0318049 A1 Nov. 28, 2013

Related U.S. Application Data

(60) Provisional application No. 61/650,538, filed on May 23, 2012.

(51) Int. Cl.
*G06F 17/30* (2006.01)
*G06Q 10/00* (2012.01)

(52) U.S. Cl.
CPC .... *G06F 17/30371* (2013.01); *G06F 17/30424* (2013.01); *G06Q 10/00* (2013.01)

(58) Field of Classification Search
USPC .......................................................... 707/687
See application file for complete search history.

(56) References Cited

U.S. PATENT DOCUMENTS

| | | | |
|---|---|---|---|
| 2003/0130871 A1* | 7/2003 | Rao et al. | 705/2 |
| 2005/0038692 A1* | 2/2005 | Kane et al. | 705/10 |
| 2006/0229916 A1* | 10/2006 | Michelson et al. | 705/2 |
| 2007/0067189 A1* | 3/2007 | Boris et al. | 705/3 |
| 2007/0174252 A1* | 7/2007 | Rawlings et al. | 707/3 |
| 2009/0292554 A1* | 11/2009 | Schultz | 705/2 |
| 2012/0124099 A1* | 5/2012 | Stewart | 707/802 |

* cited by examiner

*Primary Examiner* — Jay Morrison
(74) *Attorney, Agent, or Firm* — Kraguljac Law Group, LLC

(57) ABSTRACT

Systems, methods, and other embodiments associated with partial source verification are described. In one embodiment, a method includes selecting, from a corpus of records, a set of records that includes fewer records than the corpus, where each record corresponds to an instance of an electronic form that records information about a given subject. The set of records is provided for source verification.

32 Claims, 7 Drawing Sheets

PARTIAL SOURCE VERIFICATION OF EDC DATA

CROSS REFERENCE TO RELATED APPLICATIONS

This disclosure claims the benefit of U.S. Provisional Patent Application Ser. No. 61/650,538 filed May 23, 2012, titled "DATA VIEWER AND PARTIAL SOURCE VERIFICATION SYSTEMS", inventors: Scott SHEPARD, et al, and assigned to the present assignee.

BACKGROUND

Case report forms (CRFs) are used to collect information from subjects in clinical studies. To facilitate analysis, CRFs are stored electronically. The CRFs may be initially recorded on an originating document (e.g., paper form, printout from clinical instruments, and so on) and then entered into an Electronic Data Capture (EDC) system. For quality control purposes, CRFs in the EDC system are subject to source verification, in which monitoring personnel compare a CRF in the EDC with the CRF's originating document to verify that the CRF is accurate. As clinical studies grow in size, with more subjects and forms, it is becoming increasingly difficult to perform source verification.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that support partial source verification of EDC data. A sample of EDC records is automatically selected for source verification, in a manner that is blind with respect to users who generate the records. The composition of the sample set of records can be specified by authorized personnel in several ways. Records for a target number (e.g., a statistically sufficient number for establishing a desired quality level) of subjects can be automatically selected for verification. Certain types of forms can be designated as requiring source verification for all subjects. In this manner, a set of records that meet user defined criteria is provided to monitoring personnel, without requiring verification of all records in the corpus.

In the following description, partial source verification will be described in the context of subjects participating in clinical studies. Partial source verification may be used in any number of environments that rely on source verification to ensure the quality of EDC records. The techniques described herein are useful for selecting and providing a sample set of EDC records for verification.

Figure 1:
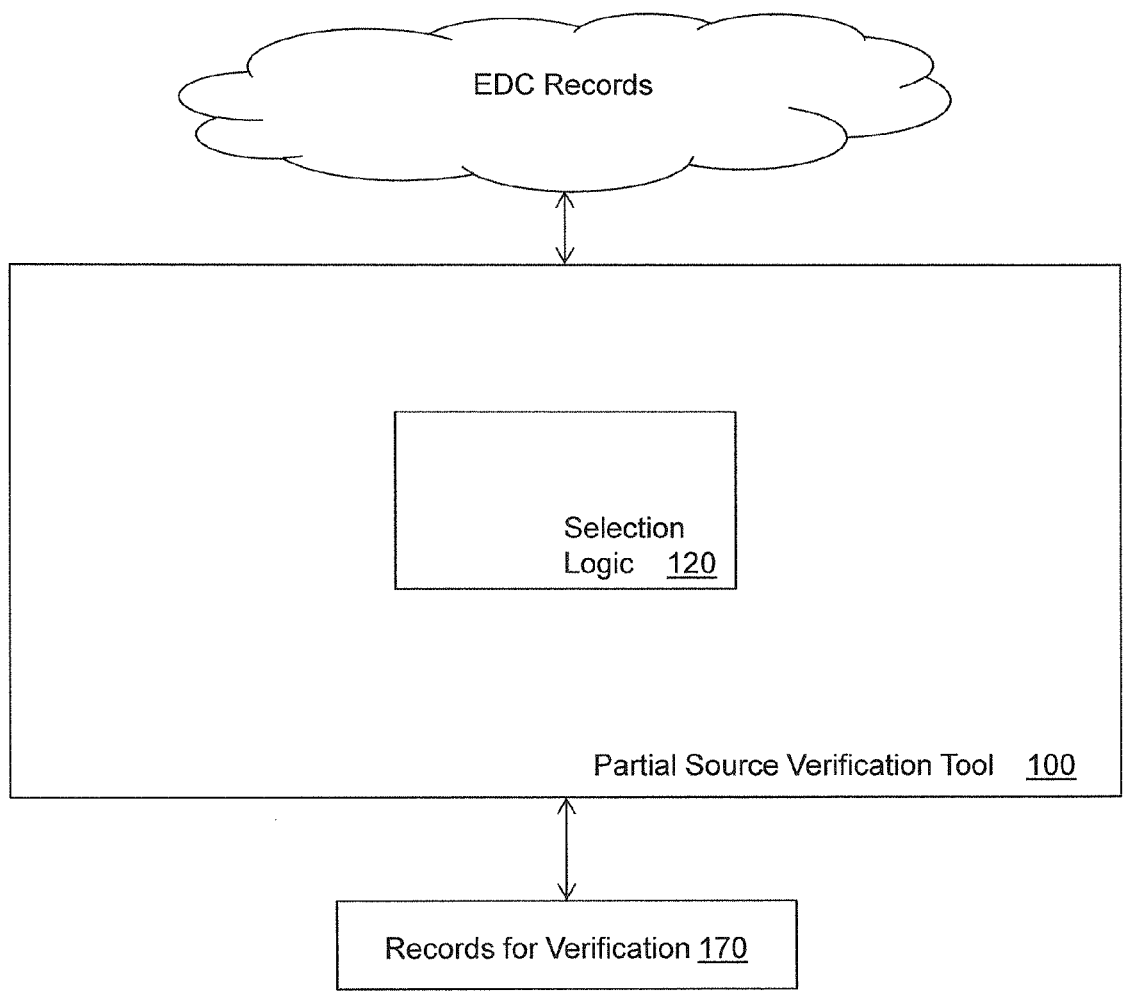
FIG. 1 illustrates one example embodiment of a system associated with partial source verification for EDC data.

With reference to FIG. 1, one example embodiment of a partial source verification tool 100 for use with a corpus of EDC records is illustrated. Each EDC record in the corpus corresponds to an instance of an electronic form (e.g., a CRF) that records information about a given subject. When used in a clinical study environment, each EDC record may correspond to an instance of a medical information form filled out for a particular patient or subject participating in a clinical study when the subject visits a testing site. Note that each subject in the study will have multiple forms and thus multiple records for each subject are in the corpus of EDC records. As studies get larger, the number of EDC records in the corpus increases significantly, making verification of all records impractical.

The partial source verification tool 100 includes a selection logic 120 configured to select, from the corpus of EDC records, a set of records for verification 170. The set of records for verification 170 includes fewer records than the corpus. The selection logic 120 is configured to provide the set of records for source verification 170 to monitoring personnel. Identifiers for records in the set of records for source verification 170 may be provided to monitoring personnel in a simple list form. In one embodiment, navigable links to records in the set of records for source verification 170 are provided to monitoring personnel.

The selection logic selects a given EDC record for verification (e.g., inclusion in the set 170) when the record is i) for a subject that has been designated for verification or ii) an instance of a form that has been designated for verification. Subjects can be designated for verification either manually or automatically. A particular subject may be manually designated by a user. A specified "first N" subjects (as ordered chronologically by date of enrollment or other date) may be manually designated for verification. A certain portion or percentage of subjects may be automatically designated for verification in a blind manner. When a subject is designated for verification, all records for the subject are selected for inclusion in the set of records for verification 170. When a form is designated for verification, records corresponding to all instances of the form (regardless of whether or not the subject of the form instance has been selected) are selected for the set of records for verification 170.

Figure 2:
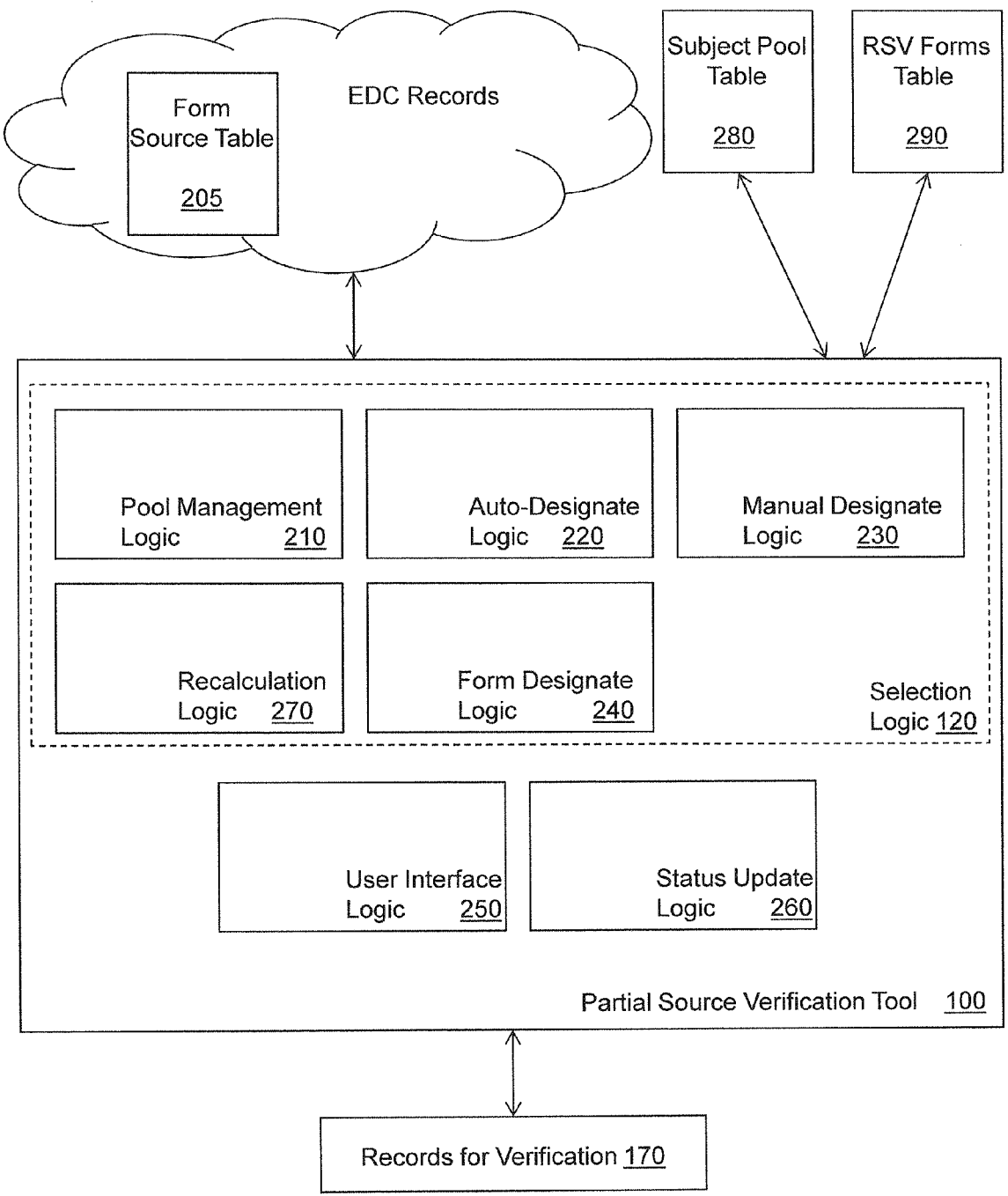
FIG. 2 illustrates one example embodiment of a system associated with partial source verification for EDC data.

FIG. 2 illustrates one example embodiment of the partial source verification tool 100. The partial source verification tool 100 includes the selection logic 120 and also provides the set of records for verification 170 to monitoring personnel. In the embodiment illustrated in FIG. 2, the selection of records by the selection logic 120 is performed using a database server (not shown) that manages EDC records in the corpus. This database-centered approach leverages the flexibility and performance benefits provided by database processing.

EDC records in the corpus are stored in a form source table 205, with each row containing an instance of an EDC form. One column in the form source table 205 stores a "requires source verification" (RSV) flag, or bit, that indicates whether or not the record has been selected for source verification. The selection logic 120 selects records with the RSV flag set when compiling the set of records for verification 170. The RSV flag is set by the partial source verification tool 100, as described in more detail below. Users entering records to the EDC corpus do not have access to the value of the RSV flag for a record, and thus cannot tell which records will be verified and which will not. The form source table 205 also includes a column for verification status. The partial source verification tool 100 includes a status update logic 260 that controls the value of a verification status bit in the verification status column of the form source table 205. When a monitoring user indicates that a record has been verified, the verification status bit is set to true in the form source table 205.

Recall that subjects can be designated for verification either manually or automatically. The partial source verification tool 100 includes a manual designate logic 230 that is configured to manually designate subjects for verification. The manual designate logic 230 may designate for verification a subject identified by a subject identifier that is received from user interface logic 250. Alternatively, or additionally, the manual designate logic 230 may receive a subject identifier from an imported file. The manual designate logic 230 may also designate for verification a "first N" subjects as ordered chronologically by enrollment date. The value for N may be received by way of the user interface logic 250. The manual designate logic 230 may also un-designate subjects that have been designated for verification so that the subjects will no longer be treated as designated subjects.

An auto-designate logic 220 is configured to automatically designate for verification a certain percentage or portion of subjects for verification. The percentage or portion may be specified as a subject selection rate set by a user through the user interface logic 250. A user may also select subjects that are to be excluded from verification, and therefore ineligible for automatic designation, as will be described in more detail below. The designation performed by the auto-designate logic 220 is blind with respect to users entering data into the corpus. To select records for verification, the partial source verification tool 100 sets the RSV flag in the form source table 205 for all records associated with subjects that are either manually or automatically designated for verification.

To manage the designation and selection processes, the partial source verification tool 100 includes a pool management logic 210 that maintains two tables: a subject pool table 280 and an RSV forms table 290. The RSV forms table 290 records, by form identifier, all forms that have been designated by way of a form designate logic 240 as requiring verification. The user interface 250 may be used to receive form identifiers for forms that have been designated as requiring verification. In one embodiment, the form designate logic 240 is configured to designate for verification all forms that include a form item that has been designated as critical. For example, if a form item "weight" has been designated as critical, the form designate logic 240 designates, for inclusion in the RSV forms table, all forms that include the form item "weight."

Figure 3:
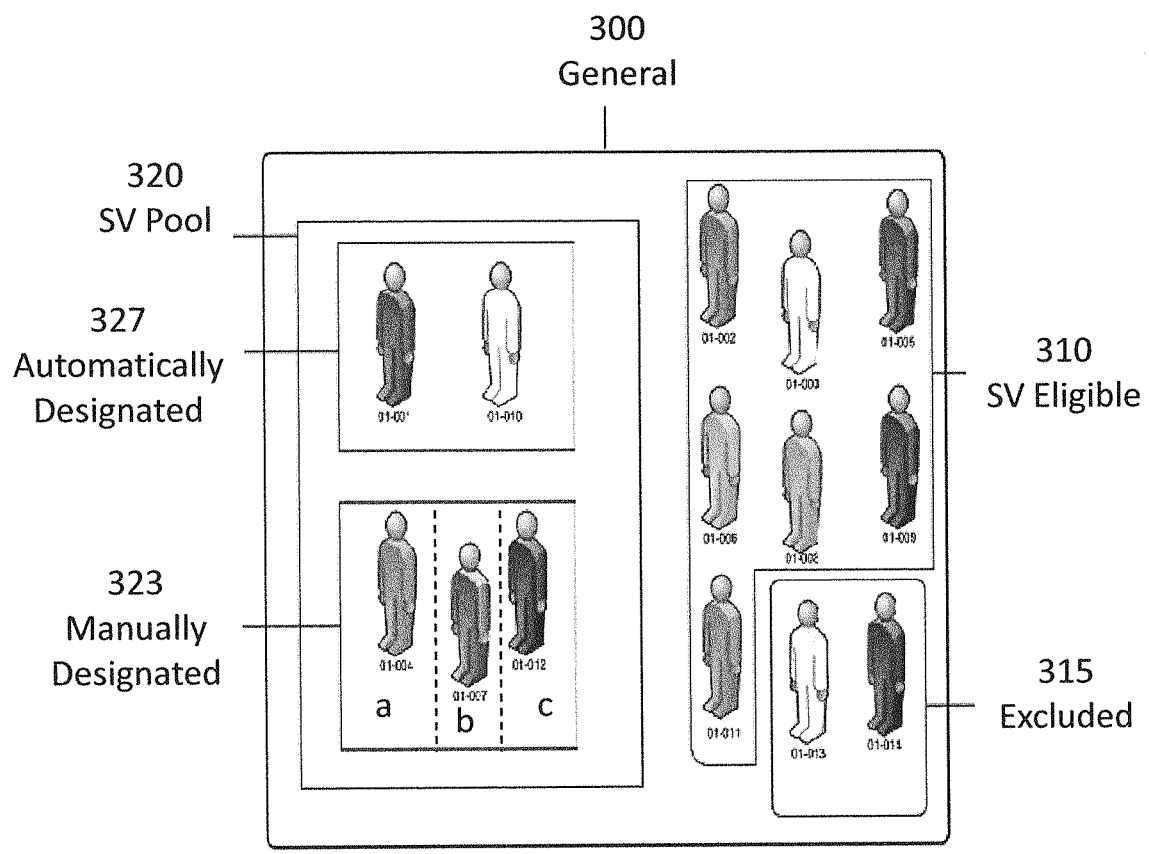
FIG. 3 illustrates one example embodiment of a pooling scheme for subjects in a clinical study for use in partial source verification for EDC data.

The subject pool table 280 maps, by subject identifiers, all subjects having at least one record in the form source table 205 to one of several pools. FIG. 3 illustrates one example of a subject pooling scheme that illustrates how records are mapped to pools in the subject pool table 280. All subjects having at least one record in the corpus are in a general pool 300. Subjects in the general pool 300 that are eligible for source verification are assigned to a source verification (SV) eligible pool 310. Subjects may be excluded from partial source verification by assigning the excluded subjects to an excluded pool 315.

Subjects in the SV eligible pool 310 are re-assigned to a source verification (SV) pool 320 when they have been designated for verification by the partial source verification tool 100. All records for subjects in the SV pool 320 are in the set of records for verification (e.g. 170 in FIG. 2). Thus, all records for subjects in the SV pool 320 have the RSV flag set in the forms source table 205 (FIG. 2).

The SV pool 320 is divided into two pools, a manually designated pool 323 and an automatically designated pool 327. In one embodiment, there are three sub-pools of the manually designated pool 323. Pool 323a holds subjects that were designated by identifier through the user interface. Pool 323b holds subjects that were designated in an imported file. Pool 323c holds subjects that were designated by the first N criteria. An automatically selected pool 327 includes subjects that were designated by sampling a certain percentage of the SV eligible pool. Thus, a subject is mapped to one of six pools: i) SV eligible 310, ii) excluded 315, iii) manually designated via interface by identifier 323a, iv) manually designated via imported file 323b, v) manually designated by first N criteria 323c, or vi) automatically designated 327.

Returning to FIG. 2, the partial source verification tool 100 queries the subject pool table 280 to identify subjects that have been designated for verification (e.g., all records for subjects mapped to pools 323a, 323b, 323c, and 327). The partial source verification tool 100 queries the form source table 205 to identify records for the designated subjects. The partial source verification tool 100 sets the RSV flag for the identified records. The partial source verification tool 100 then queries the RSV forms table to identify forms that have been designated for verification. The partial source verification tool 100 sets the RSV flag for all the identified records that are not already selected by virtue of being associated with a designated subject.

At any given time subjects that are eligible for auto-designation are readily identifiable by virtue of being mapped to the SV eligible pool in the subject pool table 280. The auto-designate logic 220 queries the subject pool table 280 to identify which subjects are eligible for automatic designation (e.g., subjects in SV eligible pool 310 in FIG. 3). The auto-designate logic 220 blindly designates subjects from the SV eligible pool by causing the pool management logic 210 to map designated subjects to the automatically selected pool. (e.g., pool 327 in FIG. 3). Automatic designation continues until a predetermined target number of subjects has been designated. The target number of subjects that should be in the automatically designated pool is determined by applying the subject selection rate to a number of subjects in the combined SV eligible and automatically designated pools and rounding up to the nearest whole number.

Thus, in the described database embodiment, a subject or form is designated for verification in either the subject pool table 280 or the RSV form table 290, respectively. A record is selected for verification and added to the set of records for verification 170 by having the RSV flag set in the form source table 205.

During the course of a study, subjects may be added to the corpus, subjects may be manually moved out of the automatically designated pool or subjects may be moved into or out of the SV eligible pool. In addition, a user may change the subject selection rate. A recalculation logic 270 ensures that at any given time, a sufficient number of subjects has been automatically designated to meet the subject selection rate.

Figure 6:
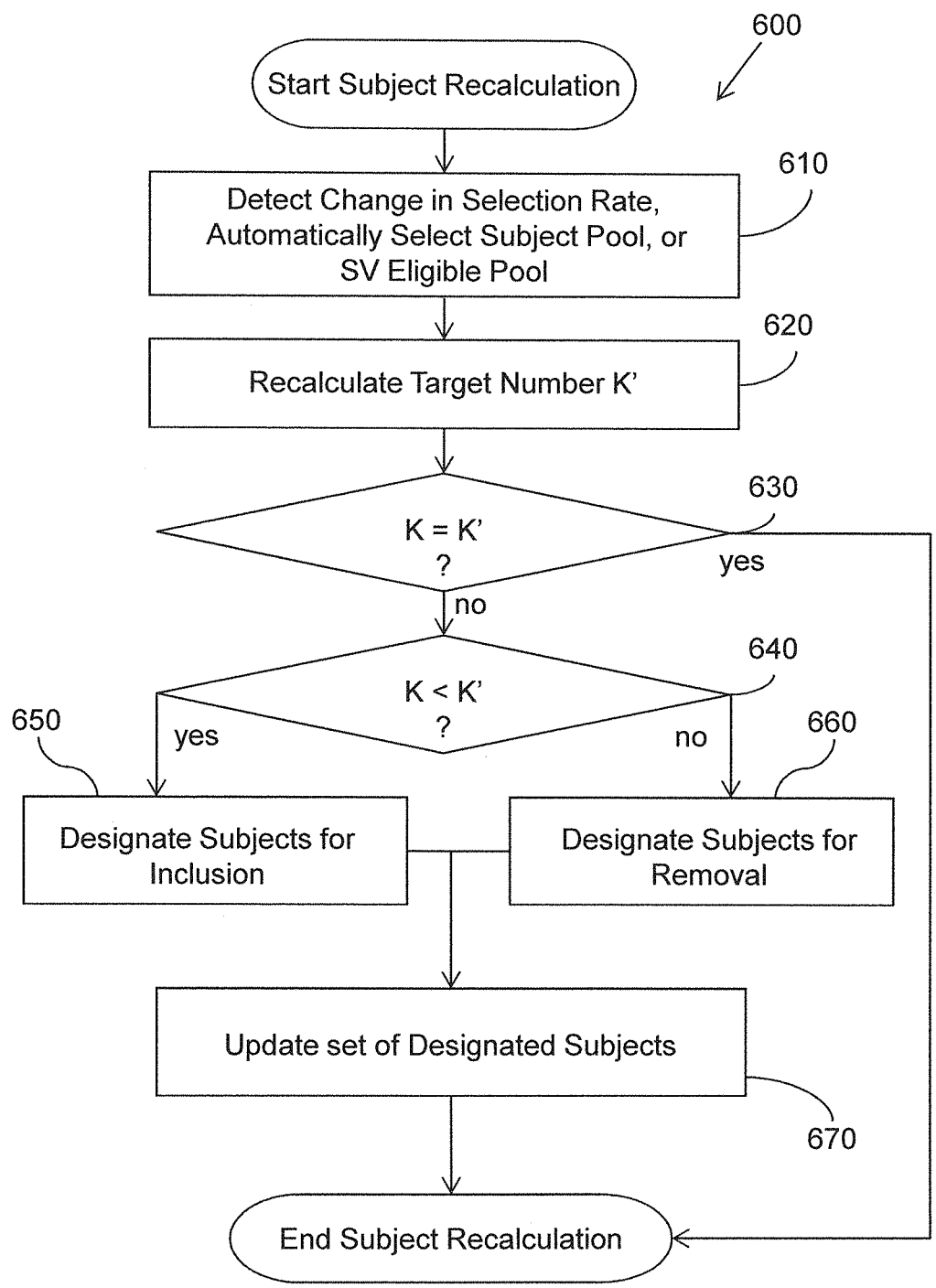
FIG. 6 illustrates one example embodiment of a method associated with partial source verification for EDC data.

FIG. 6 illustrates one method that can be used to adjust the set of automatically designated subjects when changes make such a change necessary.

Figure 4:
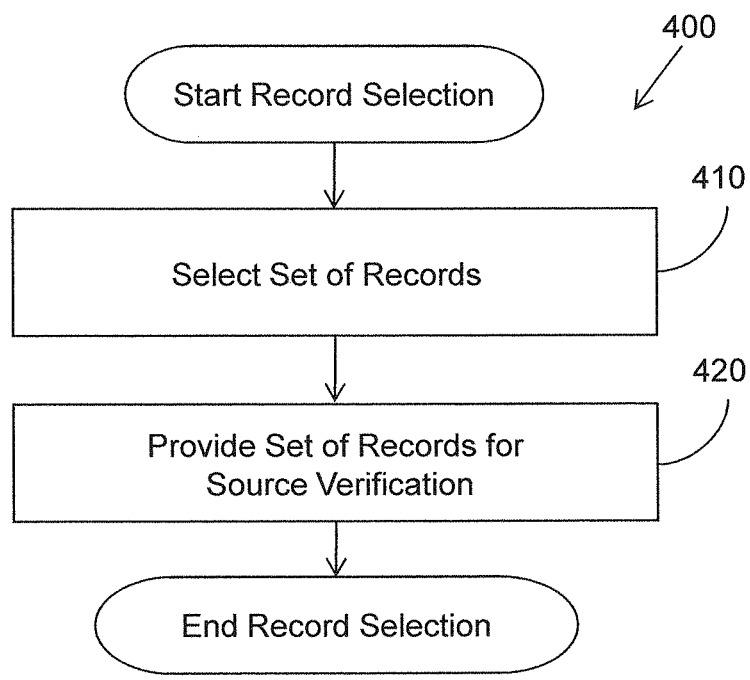
FIG. 4 illustrates one example embodiment of a method associated with partial source verification for EDC data.

FIG. 4 illustrates a method 400 associated with record selection for partial source verification. At 410, the method includes selecting, from a corpus of records, a set of records that includes fewer records than the corpus. Each record corresponds to an instance of an electronic form that records information about a given subject. At 420, the method includes providing the set of records for source verification.

Figure 5:
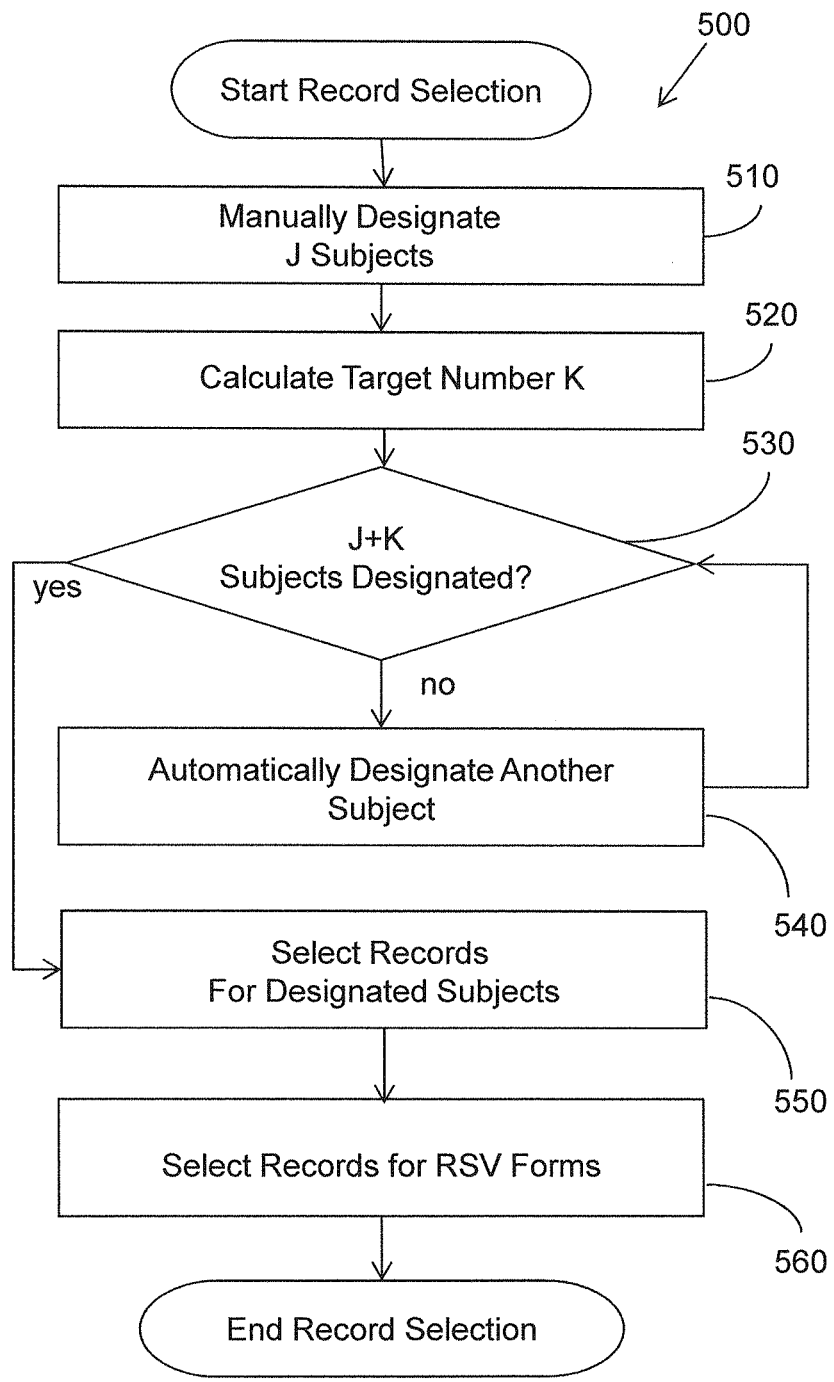
FIG. 5 illustrates one example embodiment of a method associated with partial source verification for EDC data.

FIG. 5 illustrates one example embodiment of a method 500 that is associated with record selection for partial source verification. At 510, a number J subjects are manually designated. Subjects are manually designated by assigning the subjects to the manually designated pool in the subject pool table (280 in FIG. 2). In one embodiment, manual designation may proceed as follows. A number N is received that specifies the first N criteria described above. Subjects that have been specifically identified either by way of the user interface or an imported file are assigned to the manually designated pool. Then, remaining subjects (e.g., subjects remaining in the SV eligible pool) are ordered according to some chronological criteria, such as enrollment date. N subjects having the earliest date are assigned to the manually designated pool.

At 520, a target number K is calculated for use in automatic designation. Automatic designation is when subjects are blindly sampled until a certain proportion of subjects has been designated for verification. In one embodiment, the target number K is calculated by applying a user specified subject selection rate to the number of subjects in the SV eligible pool. For example, a user may specify that 30% of subjects should be designated for source verification. The number of subjects in the SV eligible pool may be determined by accessing the subject pool table (280 in FIG. 2). So if 10 subjects remain in the SV eligible pool after manual designation, the target number would be 3.

At 530, the number of subjects that has been designated for verification is determined. The number of designated subjects may be determined by accessing the subject pool table and counting a number of subjects in the SV pool (e.g., manually designated pool combined with the automatically designated pool). If the number of subjects in the SV pool is not yet equal to the number of manually designated subjects J plus the target number K, another subject is automatically designated at 540. A subject is automatically designated by re-assigning the subject from the SV eligible pool to the automatically designated pool.

Subjects are automatically designated until the target number has been reached at 530. At 550, records for all designated subjects are selected for verification. In one embodiment, records are selected for verification by first querying the subject pool table (280 in FIG. 2) to return subject identifiers for subjects in the SV pool (e.g., either the manually designated pool or the automatically designated pool). Then the form source table (205 in FIG. 2) is queried to identify all records for the returned subject identifiers. RSV flags in the records returned by the query on the form source table are set to indicate that the records are selected for verification.

At 560, records corresponding to instances of RSV forms that have been designated for verification are selected. In one embodiment, records are selected by querying the RSV form table (290 in FIG. 2) to return form identifiers for RSV forms. Then the form source table (205 in FIG. 2) is queried to identify all as yet unselected records having the form identifier. RSV flags in the records returned by the query on the form source table are set to indicate that the records are selected for verification. Selecting records for RSV forms after selecting records for designated subjects simplifies the query process. This is because the number of records that must be searched is diminished by the records that have already been selected due to subject designation.

FIG. 6 illustrates one example embodiment of a method 600 that recalculates the pool of subjects to maintain an appropriate number of subjects designated for verification according to the user specified criteria. A number K subjects are present in the automatically designated pool. At 610, a change is detected in the subject selection rate, the number of subjects in the SV eligible pool, or the number of subjects in the automatically designated pool. At 620, the target number is recalculated to produce K' by applying the subject selection rate to the number of total number subjects already automatically designated and the number of subjects in the SV eligible pool.

At 630, if the number of subjects in the automatically designated pool K is equal to the recalculated target number K', the method ends. At 640, if the number of subjects in the automatically designated pool K is less than the recalculated target number K', at 650 a sufficient number of additional subjects are included in the set of subjects automatically designated for verification. At 640, if the number of subjects in the automatically designated pool K is higher than the recalculated target number K', at 660 subjects are identified for removal from the automatically designated pool so that the number of subjects in the automatically designated pool will correspond to the recalculated target number.

In one embodiment, automatically designated subjects are selected for return to the SV eligible pool at 660 based on a number of forms for the subject that have already been verified. The verification status of records corresponding to form instances for each subject can be determined by checking the verification status bit in the record for the form instance in the form source table 205. Subjects having the least number of verified forms are moved to the SV eligible first. This preserves the most manual verification work that has already been performed after the automatically designated pool of subjects is adjusted.

At 670, the set of records for verification is updated to either add records for newly added subjects or remove records for subjects that have been removed from the automatically designated pool. The set of records for verification may be updated by changing the value of the RSV flag in the form source table (205, FIG. 2).

General Computer Embodiment

Figure 7:
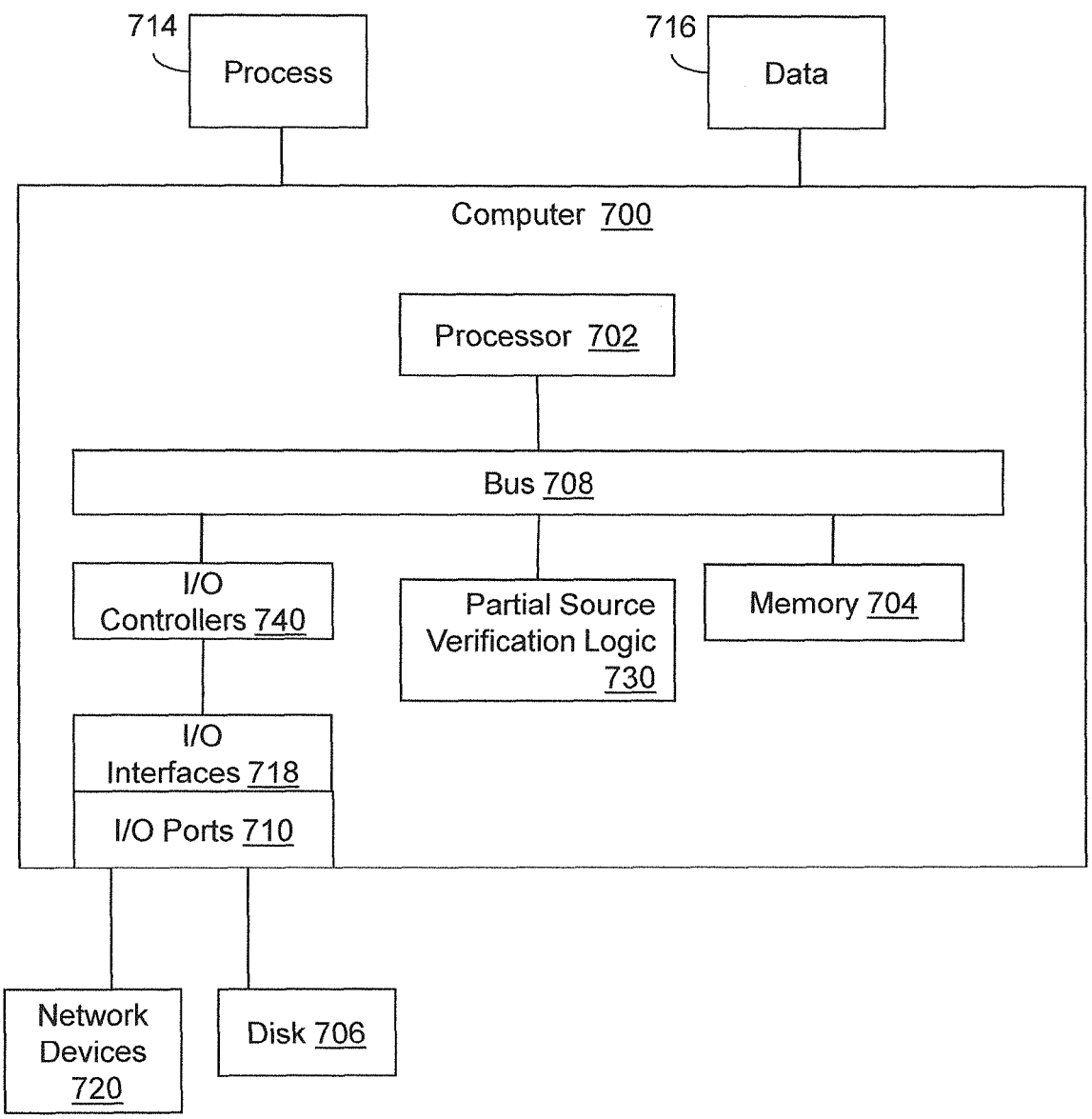
FIG. 7 illustrates an embodiment of a computing system in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a partial source verification logic 730 configured to facilitate partial source verification. In different examples, the partial source verification logic 730 may be implemented in hardware, a non-transitory computer-readable medium with stored instructions, firmware, and/or combinations thereof. While the logic 730 is illustrated as a hardware component attached to the bus 708, it is to be appreciated that in one example, the partial source verification logic 730 could be implemented in the processor 702.

In one embodiment, logic 730 is a means (e.g., hardware, non-transitory computer-readable medium, firmware) for partial source verification.

The means may be implemented, for example, as an ASIC programmed to perform partial source verification. The means may also be implemented as stored computer executable instructions that are presented to computer 700 as data 716 that are temporarily stored in memory 704 and then executed by processor 702.

Logic 730 may also provide means (e.g., hardware, non-transitory computer-readable medium that stores executable instructions, firmware) for performing methods outlined with respect to FIGS. 1-6.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 724 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to:
   access a corpus of records stored in a database, where each record corresponds to an instance of an electronic form that records information about a given subject, and further where each record is input by a user referring to an originating document;
   further where each record includes a "requires source verification" (RSV) value in a predetermined RSV field that is populated by a database server in a manner such that a user who input a given electronic form cannot access the RSV value for the electronic form, where the RSV value can be set to a first value that indicates the record has been selected for source verification;
   identify subjects that have been designated for source verification;
   control the database server to i) identify records that record information about an identified subject and ii) set the RSV value to the first value for the identified records;
   identify forms that have been designated for source verification;
   control the database server to i) identify records that correspond to an instance of an identified form and ii) set the RSV value to the first value for the identified records;
   control the database server to query the database to return a set of records having an RSV value set to the first value, and
   provide the set of records to a user performing source verification in which each record in the set is compared to an originating document for the record.

2. The non-transitory computer-readable medium of claim 1, further comprising instructions configured to cause the computer to:
   receive a number n that specifies a number of subjects for selection that meet a predetermined chronological criteria;
   designate for verification a set of n subjects that meet the chronological criteria; and
   control the database server to i) identify records that record information about a subject in the set and ii) set the RSV value to the first value for the identified records.

3. The non-transitory computer-readable medium of claim 1, further comprising instructions configured to cause the computer to:
   identify subjects that are assigned to a pool of subjects that are eligible for automatic designation;
   automatically designate for source verification one or more subjects from the pool of subjects that are eligible for automatic designation;
   control the database server to i) identify records that record information about a designated subject and ii) set the RSV value to the first value for the identified records; and
   where automatically selecting comprises selecting records in a manner that is blind with respect to users who input the records.

4. The non-transitory computer-readable medium of claim 3, further comprising instructions configured to cause the computer to:
   identify a total number m subjects having records in the pool of subjects eligible for automatic designation;
   calculate a number k of subjects for automatic designation by applying a subject selection rate to the number m;
   automatically designate for verification a set of k subjects from the m subjects;
   control the database server to i) identify records that record information about a designated subject and ii) set the RSV value in the identified records to the first value.

5. The non-transitory computer-readable medium of claim 1, further comprising instructions configured to cause the computer to:
   receive, from a user, a subject identifier that identifies a subject having at least one record in the corpus; and
   assign the identified subject to a pool of subjects that are not eligible for automatic designation.

6. The non-transitory computer-readable medium of claim 1, further comprising instructions configured to cause the computer to:
   receive, from a user, a subject identifier that identifies a subject having at least one record in the corpus; and
   assign the identified subject to a pool of subjects that is designated for source verification.

7. The non-transitory computer-readable medium of claim 1, further comprising instructions configured to cause the computer to:
   identify a form component within an electronic form, where the form component is designated for source verification;
   identify electronic forms that include the form component;
   designate the identified electronic forms for source verification;
   control the database server to select, from the corpus, records corresponding to instances of the designate electronic forms; and control the database server to set the RSV value in the selected records to the first value.

8. The non-transitory computer-readable medium of claim 1, further comprising instructions configured to cause the computer to:
receive, from a user performing source verification, a verification status for a record; and
control the database server to store, in the record, the verification status for the record.

9. The non-transitory computer-readable medium of claim 1 further comprising instructions configured to cause the computer to display a navigable link to records in the set.

10. A computing system, comprising:
a processor; and
a database configured to store a corpus of records, where each record corresponds to an instance of an electronic form that records information about a given subject, and further where each record is input by a user referring to an originating document;
further where each record includes a "requires source verification" (RSV) value in a predetermined RSV field that is populated by a database server in a manner such that a user who input a given electronic form cannot access the RSV value for the electronic form, where the RSV value can be set to a first value that indicates the record has been selected for source verification;
a selection logic configured to cause the processor to:
maintain a subject table that records subjects that have been designated for source verification;
control the database server to i) identify records that record information about each subject in the subject table and ii) set the RSV value to the first value for the identified records;
maintain a form table that records forms that have been designated for source verification;
control the database server to i) identify records that correspond to an instance of a form in the form table and ii) set the RSV value to the first value for the identified records;
control the database server to query the database to return a set of records having an RSV value set to the first value, and
provide the set of records to a user performing source verification in which each record in the set is compared to an originating document for the record.

11. The computing system of claim 10, where the selection logic comprises:
a pool management logic configured to maintain a subject pool table that maps respective subjects into respective selection pools, where the selection pools include an automatic designation eligible pool;
an automatic designate logic configured to cause the processor to i) automatically designate for verification subjects in the automatic designation eligible pool until a target number of subjects has been designated, where automatically designating comprises designating subjects in a manner that is blind with respect to users generating the records; and
where the selection logic is configured to control the database server to i) identify records that record information about a designated subject and ii) set the RSV value to the first value for the identified records.

12. The computing system of claim 11, where the automatic designate logic is configured to cause the processor to:
execute a query on the subject pool table to determine a number of subjects in the automatic designation eligible pool;
apply a subject selection rate to the number of identified subjects to determine the target number; and
designate for verification a target number of subjects in the automatic designation eligible pool.

13. The computing system of claim 11, where the selection pools include manually selected pool, where the selection logic comprises:
a user interface logic configured to cause the processor to receive manually designated subject identifiers from a user; and
a manual select logic configured to cause the processor to designate for verification subjects corresponding to the manually selected subject identifiers.

14. The computing system of claim 10, further comprising a status update logic configured to cause the processor to:
receive, from a user performing source verification, a verification status for a record; and
control the database server to store, in a row for the record, the verification status in a column of a database table that stores the corpus of records.

15. The computing system of claim 10 where the selection logic is further configured to cause the processor to display a navigable link to records in the set.

16. A non-transitory computer-readable medium storing computer-executable instructions that when executed by a computer cause the computer to:
maintain a subject pool table that assigns subjects to one of a plurality of pools, where the pools include a first pool of subjects that have been designated for source verification and a second pool of subjects that have not been designated for source verification and are eligible for automatic designation for source verification;
designate for verification subjects that have been manually designated by a user by assigning the subjects to the first pool;
calculate a target number of subjects by applying a subjection selection rate to a total number of subjects in the second pool;
automatically designate for source verification a target number of subjects from the second pool by assigning the automatically designated subjects to the first pool,
where automatically designating comprises designating subjects in a manner that is blind with respect to users inputting the records;
control a database server to select records for subjects in the first pool by setting an "requires source verification" (RSV) value in each selected record to a value that indicates that the record has been selected for source verification;
maintain a form table that records forms that have been designated for source verification;
control the database server to select from remaining unselected records each record that is an instance of a form in the form table by setting an RSV value in each selected record to a value that indicates that the record has been selected for source verification; and
provide the selected records for source verification in which each record in the set is compared to an originating document for the record.

17. The non-transitory computer-readable medium of claim 16, where the instructions for automatically selecting comprise instructions configured to cause the computer to:
order subjects in the second pool according to a chronological criteria;
manually designate for verification a designated number of subjects in the second pool having an earliest value for the chronological criteria assigning the manually designated subjects to the first pool; and from remaining subjects in the second pool, automatically designate for verification a proportion of subjects by assigning the proportion of subjects to the first pool.

18. The non-transitory computer-readable medium of claim 16, wherein the instructions for selecting respective records comprise instructions configured to cause the computer to store, in respective rows for the respective records, a RSV value in a column of a database table that stores the records.

19. The non-transitory computer-readable medium of claim 16, wherein the instructions further comprise instructions configured to cause the computer to remove subjects that have been designated as excluded from the pool of subjects eligible for automatic designation by assigning the excluded subjects to a third pool of subjects that are not eligible for automatic designation.

20. A computer-implemented method, comprising:
accessing a corpus of records stored in a database, where each record corresponds to an instance of an electronic form that records information about a given subject, and further where each record is input by a user referring to an originating document;
further where each record includes a "requires source verification" (RSV) value in a predetermined RSV field that is populated by a database server in a manner such that a user who input a given electronic form cannot access the RSV value for the electronic form, where the RSV value can be set to a first value that indicates the record has been selected for source verification;
identifying subjects that have been designated for source verification;
controlling the database server to i) identify records that record information about an identified subject and ii) set the RSV value to the first value for the identified records;
identifying forms that have been designated for source verification;
controlling the database server to i) identify records that correspond to an instance of an identified form and ii) set the RSV value to the first value for the identified records;
controlling the database server to query the database to return a set of records having an RSV value set to the first value, and
providing the set of records to a user performing source verification in which each record in the set is compared to an originating document for the record.

21. The computer-implemented method of claim 20, further comprising:
receiving a number n that specifies a number of subjects for selection that meet a predetermined chronological criteria;
designating for verification a set of n subjects that meet the chronological criteria; and
controlling the database server to i) identify records that record information about a subject in the set and ii) set the RSV value to the first value for the identified records.

22. The computer-implemented method of claim 20, further comprising:
identifying subjects that are assigned to a pool of subjects that are eligible for automatic designation;
automatically designating for source verification one or more subjects from the pool of subjects that are eligible for automatic designation;
controlling the database server to i) identify records that record information about a designated subject and ii) set the RSV value to the first value for the identified records; and
where automatically selecting comprises selecting records in a manner that is blind with respect to users who input the records.

23. The computer-implemented method of claim 22, further comprising:
identifying a total number m subjects having records in the pool of subjects eligible for automatic designation;
calculating a number k of subjects for automatic designation by applying a subject selection rate to the number m;
automatically designating for verification a set of k subjects from the m subjects;
controlling the database server to i) identify records that record information about a designated subject and ii) set the RSV value in the identified records to the first value.

24. The computer-implemented method of claim 20, further comprising:
receiving, from a user, a subject identifier that identifies a subject having at least one record in the corpus; and
assigning the identified subject to a pool of subjects that are not eligible for automatic designation.

25. The computer-implemented method of claim 20, further comprising:
receiving, from a user, a subject identifier that identifies a subject having at least one record in the corpus; and
assigning the identified subject to a pool of subjects that is designated for source verification.

26. The computer-implemented method of claim 20, further comprising:
identifying a form component within an electronic form, where the form component is designated for source verification;
identifying electronic forms that include the form component;
designating the identified electronic forms for source verification;
controlling the database server to select, from the corpus, records corresponding to instances of the designate electronic forms; and
controlling the database server to set the RSV value in the selected records to the first value.

27. The computer-implemented method of claim 20, further comprising:
receiving, from a user performing source verification, a verification status for a record; and
controlling the database server to store, in the record, the verification status for the record.

28. The computer-implemented method of claim 20, further comprising displaying a navigable link to records in the set.

29. A computer-implemented method, comprising:
maintaining a subject pool table that assigns subjects to one of a plurality of pools, where the pools include a first pool of subjects that have been designated for source verification and a second pool of subjects that have not been designated for source verification and are eligible for automatic designation for source verification;
designating for verification subjects that have been manually designated by a user by assigning the subjects to the first pool;
calculating a target number of subjects by applying a subjection selection rate to a total number of subjects in the second pool;

automatically designating for source verification a target number of subjects from the second pool by assigning the automatically designated subjects to the first pool, where automatically designating comprises designating subjects in a manner that is blind with respect to users inputting the records;

controlling a database server to select records for subjects in the first pool by setting an "requires source verification" (RSV) value in each selected record to a value that indicates that the record has been selected for source verification;

maintaining a form table that records forms that have been designated for source verification;

controlling the database server to select from remaining unselected records each record that is an instance of a form in the form table by setting an RSV value in each selected record to a value that indicates that the record has been selected for source verification and providing the selected records for source verification in which each record in the set is compared to an originating document for the record.

30. The computer-implemented method of claim 29, where the automatically selecting comprises:

order subjects in the second pool according to a chronological criteria;

manually designating for verification a designated number of subjects in the second pool having an earliest value for the chronological criteria by assigning the manually designated subjects to the first pool; and from remaining subjects in the second pool, automatically designating for verification a proportion of subjects by assigning the proportion of subjects to the first pool.

31. The computer-implemented method of claim 29, wherein the selecting respective records comprises storing, in respective rows for the respective records, a RSV value in a column of a database table that stores the records.

32. The computer-implemented method of claim 29, further comprising removing subjects that have been designated as excluded from the pool of subjects eligible for automatic designation by assigning the excluded subjects to a third pool of subjects that are not eligible for automatic designation.

* * * * *